(12) United States Patent
Shibukawa et al.

(10) Patent No.: US 7,714,478 B2
(45) Date of Patent: May 11, 2010

(54) ELECTRIC ROTARY MACHINE

(75) Inventors: Yuichi Shibukawa, Kanagawa (JP); Kenta Suzuki, Yokohama (JP); Kenji Narita, Kawasaki (JP); Takashi Suzuki, Kawasaki (JP); Takushi Fujioka, Kawasaki (JP); Tomonori Kojima, Kawasaki (JP); Masanori Murakami, Kawasaki (JP); Yoichi Tanabe, Kawasaki (JP); Masaki Yamada, Kawasaki (JP)

(73) Assignees: Nissan Motor Co., Ltd., Yokohama-shi, Kanagawa (JP); Fujitsu General Limited, Kawasaki-shi, Kanagawa (JP)

( * ) Notice: Subject to any disclaimer, the term of this patent is extended or adjusted under 35 U.S.C. 154(b) by 282 days.

(21) Appl. No.: 11/797,845

(22) Filed: May 8, 2007

(65) Prior Publication Data
US 2007/0262674 A1 Nov. 15, 2007

(30) Foreign Application Priority Data
May 10, 2006 (JP) .............................. 2006-131400

(51) Int. Cl.
*H02K 1/22* (2006.01)
(52) U.S. Cl. ................................ 310/268; 310/216.106
(58) Field of Classification Search .................. 310/268, 310/216, 89
See application file for complete search history.

(56) References Cited

U.S. PATENT DOCUMENTS

| | | | | |
|---|---|---|---|---|
| 5,175,460 | A * | 12/1992 | Ishizuka | ................ 310/154.09 |
| 6,700,269 | B2 * | 3/2004 | Torii et al. | ............. 310/154.08 |
| 6,765,327 | B2 | 7/2004 | Hashimoto et al. | |
| 7,064,467 | B2 * | 6/2006 | Yokota et al. | ................ 310/215 |
| 7,164,218 | B2 * | 1/2007 | Kimura et al. | .............. 310/216 |
| 2004/0145252 | A1 | 7/2004 | Arimitsu et al. | |
| 2007/0080598 | A1 | 4/2007 | Naruse | |

FOREIGN PATENT DOCUMENTS

| | | |
|---|---|---|
| CN | 1032719 A | 5/1989 |
| CN | 1515060 A | 7/2004 |
| JP | 8-163848 A | 6/1996 |
| JP | 2005-522166 A | 7/2005 |
| JP | 2005-341716 A | 12/2005 |
| WO | WO 03/084027 | 10/2003 |

OTHER PUBLICATIONS

U.S. Appl. No. 11/638,710, filed Dec. 14, 2006, Yuichi Shibukawa.

\* cited by examiner

*Primary Examiner*—Nguyen N Hanh
(74) *Attorney, Agent, or Firm*—Foley & Lardner LLP

(57) ABSTRACT

In an electric rotary machine, a stator, a metallic supporting member configured to support the stator, and a rotor are provided, the rotor is relatively rotatably supported with respect to the stator, a magnetic path is formed via a gap portion between the stator and the rotor to give a torque to the rotor, and a space section is provided to interrupt the magnetic path at a position of the metallic supporting member near to a magnetic pole of the stator facing the gap portion.

16 Claims, 9 Drawing Sheets

CROSS SECTION CUT AWAY
ALONG LINE A-A OF FIG.4

CROSS SECTION CUT AWAY
ALONG LINE B-B OF FIG.4

US 7,714,478 B2

ELECTRIC ROTARY MACHINE

BACKGROUND OF THE INVENTION (1) Field of the Invention

The present invention relates to an electric rotary machine in which a magnetic circuit (or a magnetic path) is formed between a rotor and a stator, and, more specifically, relates to a technique in the electric rotary machine which prevents a reduction of a driving efficiency generated due to an overflow of the magnetic path from a naturally ideal position of the magnetic path.

(2) Description of the Related Art

An electric machine in which a stator in which coil windings are equipped is supported by means of a metallic supporting member is exemplified by a Japanese Patent Application Publication (tokouhyou) of PCT Application (whose international publication is WO 03/084027) No. 2005-522166 published on Jul. 21, 2005 which corresponds to a U.S. Pat. No. 6,765,327 issued on Jul. 20, 2004.

The previously proposed electric rotary machine disclosed in the above-described Japanese Patent Application Publication houses a rotor and the stator in an internal spatial region of a case made of an aluminum alloy. Cooling fins are attached on an external of the case. The stator is attached in an inside of the case. The stator is laminated with a plurality of thin-plate steel plates and non electrically conductive nonferrous layers. The stator minimizes a loss due to an eddy current of a magnetic flux at the inside of the stator. Furthermore, the stator is partitioned by means of thirty-six (36) grooves in a peripheral direction of the stator. The stator has the same number of stator cores as that of the grooves. An electrically conductive coil winding is wound on each of the stator cores. Since the case described above is formed of the aluminum alloy having a high thermal conductivity, heat generated on the coil windings and stator cores can speedily be discharged through the external of the case while a rigidity of the electric rotary machine is secured. Thus, a cooling performance of the electric rotary machine described above becomes high.

SUMMARY OF THE INVENTION

However, in the previously proposed electric rotary machine described in the BACKGROUND OF THE INVENTION, the following problem occurs. That is to say, magnetic fluxes from the rotor and from the stator pass the case having no relationship to a torque generation of the rotor. At this time, an eddy current loss of each magnetic flux occurs and a driving efficiency of the electric rotary machine becomes worsened. Suppose that the magnetic flux passing the case is called a leakage magnetic flux. Especially, in a case where a high-load driving is carried out with the magnetic fluxes from the rotor of the previously proposed electric machine and from the stator thereof enlarged, the leakage magnetic flux overflowed from a magnetic circuit (or a magnetic path) directly formed via a gap provided between the rotor and the stator becomes accordingly enlarged. As a result of this, its loss becomes non-negligibly large.

Regarding the above-described problem, the inventors (applicants) of the present application performed a model analysis for a comparative example of an axial gap electric rotary machine and clarified a portion of the axial gap electric rotary machine on which the leakage magnetic flux is remarkably present. A result of this model analysis will be explained with reference to FIGS. 9 through 11. FIG. 9 shows a partially cross sectioned perspective view of the comparative example of the axial gap electric rotary machine in which both of the rotor and the stator are arranged in an axial direction. In FIG. 9, a reference symbol A denotes a part of the rotor and a reference symbol B denotes a part of the stator. Rotor A and stator B are separately opposed by a slightly short distance from each other in the axial direction of the electric rotary machine. A clearance between rotor A and stator B is called a gap. Each of permanent magnets C is adhered onto a front surface of both front and rear surfaces of a circular plate-like rotor A which opposes against stator B via the gap. Then, permanent magnets C, C,—are arranged in a circumferential (peripheral) direction of rotor A. Stator cores D, D,—are attached onto stator B and these stator cores D, D,—are arranged in the circumferential (peripheral) direction of stator B. Coil windings E are wound on surroundings of respective stator cores D. It should be noted that part of one of coil windings E is shown in a section. An inner peripheral ring F is arranged at an inner part of stator cores D in a radial direction of stator B. An outer peripheral ring G is arranged at an outer part of stator cores D in the radial direction thereof. Then, thin-plate materials H, H,—extended in the radial direction connect these rings F, G together and serve to couple these inner and outer peripheral rings F, G to each other. Each of these rings F, G and thin-plate materials H is formed of a light metal such as aluminum or duralumin. These members F, G, H are united into one body to constitute a metallic supporting member. This metallic supporting member constitutes a framework of stator B and the electric rotary machine. A structural rigidity (or a structural strength) of the electric rotary machine is secured. Each stator core D on which coil winding E is wound is arranged between circumferentially and mutually abutting thin-plate material H, H and between rings F, G. A resin is filled on an outer periphery of each coil winding E to assure a fixing of each coil winding E between thin-plate H and rings F, G. In this electric rotary machine, the magnetic fluxes from stator cores D and from permanent magnets C form the magnetic path via the gap between rotor A and stator B. Thus, a torque is given to rotor A to rotate rotor A.

In order to improve the driving efficiency of the electric rotary machine, it is ideal that all of the magnetic fluxes pass the gap between magnetic poles of each of stator cores D and each of permanent magnets C at a shortest distance and, in other words, the magnetic path is directly formed between rotor A and stator B. However, as an actual matter of fact, a part of the magnetic fluxes from stator cores D and permanent magnets C bypasses the gap and passes members of electric rotary machine except rotor A and stator B (such as members F, G, and H). The leakage magnetic fluxes overflowed from an ideal magnetic path generate the eddy current in the magnetic flux passing members except rotor A and stator B to be converted into heat. Thus, the driving efficiency is lowered. Hence, a reduction of the leakage magnetic flux is desirable in terms of the driving efficiency.

FIG. 10 shows a perspective view of inner peripheral ring F and of outer peripheral ring G as viewed from an arrow-marked direction in FIG. 9. In FIG. 10, a distribution of a magnetic flux density of the leakage magnetic flux passing through inner peripheral ring F and outer peripheral ring G which are not the stator nor the rotor is divided into a plurality of zones on the magnetic flux density, when the axial gap electric rotary machine of the above-described comparative example is driven in an acceleration state. In FIG. 10, a zone 4 indicates a large magnetic flux density and the magnetic flux densities become smaller in an order of a zone 3, a zone 2, and a zone 1. It should be noted that the magnetic flux density is not varied in a stepwise manner for each portion shown in a zone division but the magnetic flux density is distributed so as to be varied in continuous and progressive manners from a portion at which the magnetic flux density is relatively large to a portion at which the magnetic flux density is relatively small.

FIG. 11 shows a distribution of eddy current densities caused by the leakage magnetic flux described above divided into a plurality of zones. In FIG. 11, a zone 4' indicates a large eddy current density and the eddy current densities become smaller in an order of a zone 3', a zone 2', and a zone 1'. It should be noted that the eddy current density is not varied in a stepwise manner for each portion shown in the zone division but the eddy current density is distributed so as to be varied in continuous and progressive manners from a portion at which the eddy current density is relatively large to a portion at which the eddy current density is relatively small. As shown in FIG. 11, the eddy current density becomes larger as the portion of each member becomes nearer to the gap. In other words, the eddy current density becomes larger as the portion of each member becomes nearer to the magnetic pole of each stator core D which faces against the gap and to the magnetic pole of each permanent magnet C which faces the gap.

It is, in view of the above-described actual circumstance and the result of the model analysis, to provide a technique for an electric rotary machine which can effectively prevent the leakage magnetic flux.

According to one aspect of the present invention, there is provided an electric rotary machine comprising: a stator; a metallic supporting member configured to support the stator; and a rotor, the rotor being relatively rotatably supported to the stator, a magnetic path being formed via a gap portion between the stator and the rotor to give a torque to the rotor, and a space section being provided on a portion of the metallic supporting member near a magnetic pole of the stator facing the gap portion to interrupt the magnetic path. According to a structure of the electric rotary machine in the present invention, a space section has a large magnetic resistance and the magnetic flux becomes difficult to pass through the space section. Hence, the passage of the magnetic flux through the metallic supporting member can largely be eliminated. Thus, a generation of an eddy current can be suppressed and an undesirable temperature rise of the electric rotary machine can be reduced. In addition, the leakage of the magnetic flux from the magnetic path formed between the stator and the rotor via the gap can be eliminated and the magnetic path is formed to connect a magnetic pole of an armature provided on the stator to a magnetic pole or a salient pole of each permanent magnet installed on the rotor at a shortest distance. An improvement in the driving efficiency of the electric rotary machine and a large torque can be expected. When a large torque driving at which the magnetic flux density of the magnetic path becomes large is carried out, the effect of the suppression of the heat generation and the effect of the improvement in the driving efficiency can more remarkably be enjoyed. This summary of the invention does not necessarily describe all necessary features so that the invention may also be a sub-combination of these described features. The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
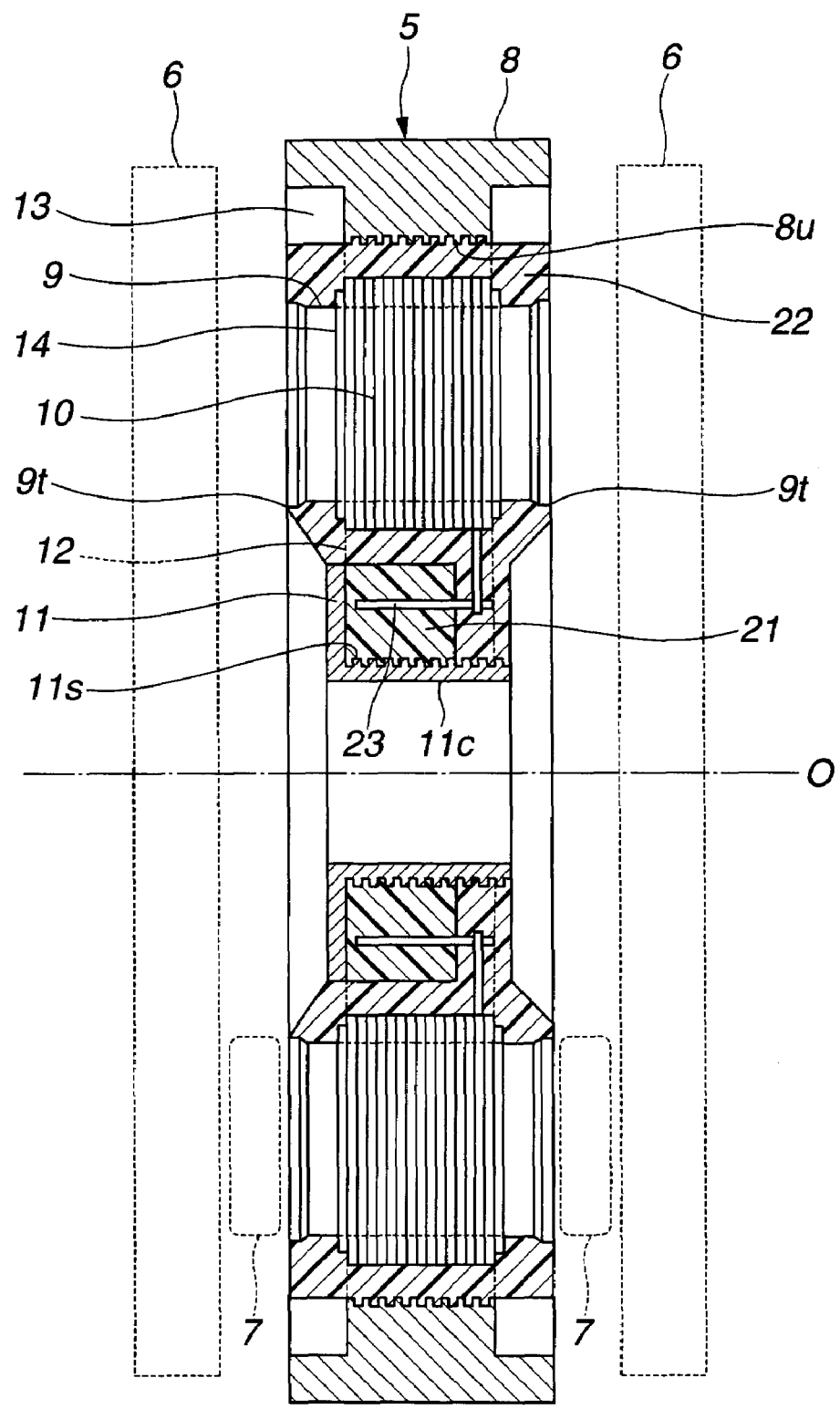
FIG. 1 is a longitudinal cross sectional view of a preferred embodiment of an electric rotary machine according to the present invention partially cut away with a plane including an axial line.

FIG. 1 shows a longitudinal cross sectional view of a stator in a preferred embodiment of an electric rotary machine according to the present invention, partially cut away with a plane including an axial line. In the preferred embodiment shown in FIG. 1, rotors 6 are arranged at both sides of a stator 5 in a direction of an axle O so as to oppose with each other via stator 5. A gap portion 7 is provided between each of rotors 6 and stator 5. A case 8 made of aluminum is installed on an outer periphery of stator 5. Case 8 may be made of a metallic raw material having a high strength (rigidity), a light weight, and a high thermal conductivity, other than the aluminum raw material. Case 8 is a hollow cylindrical member with axle 0 as a center. Stator cores 9 are attached onto an inner wall 8$u$ located at an inner peripheral surface of the hollow cylindrical member, viz., case 8. A plurality of stator cores 9 are arranged in a peripheral direction of axle O and each of stator cores 9 is extended in the direction of axle O.

Widths of both ends 9$t$, 9$t$ of stator cores 9 in the direction of axle O are extended to secure areas of stator cores 9 abutting gap portion 7. Coil windings 10 are wound around a middle portion of stator cores 9 located between both ends 9$t$, 9$t$. Insulators 14 are attached onto both ends of coil windings 10 in the direction of axle O. Insulators 14 serve to secure the fixing of the ends of coil windings 10 in the direction of axle O onto the outer periphery of stator cores 9. Stator cores 9 and coil windings 10 constitute an armature.

A hollow cylindrical shaped inner peripheral ring 11 is arranged in an inner diameter direction of each of stator cores 9. Inner peripheral ring 11 is made of aluminum and a shaft (not shown) extended along the direction of axle O and coupled with each rotor 6 is penetrated through a center hole 11c formed by an inner wall of inner peripheral ring 11. Outer walls 11s of inner peripheral ring 11 are coupled with inner walls 8u of case 8 via thin plate members 12 extended in the radial direction of stator 5. Theses thin plate members 12 are alternately arranged with respective stator cores 9 in the peripheral (circumferential) direction of axle O. Stator cores 9 on which coil windings 10 are wound are disposed between mutually adjacent case 8 and inner peripheral ring 11 in the radial direction and between mutually adjacent thin plate members 12, 12 in the peripheral direction. This disposition method is as follows: That is to say, a projection 23 such as a terminal projected from each of coil windings 10 is, at first, preliminarily fixed to each of outer walls 11s of inner peripheral ring 11 by means of a resin 21. At the next stage, a resin 22 is used to enclose a whole surrounding of coil windings 10 and, thereafter, respective stator cores 9 on which coil windings 10 are wound are completely fixed onto inner walls 8u and outer walls 11s.

Case 8 is, as described above, formed of the hollow cylindrical shape. A thickness of case 8 in the radial direction of stator 5 is not wholly uniform. In other words, the thickness of case 8 in the radial direction of stator 5 is formed to become small (thin) so as to provide a recess from an inner wall direction of case 8 toward an outer diameter direction of case 8 at both ends of the axial direction of stator 5. Thus, a space section 13 is provided at a portion (or position) of case 8 which is near to corresponding one of tips (or end) 9t of each stator core 9. The radial directional thickness of each stator core 9 is formed largely (to become thick) for the inner wall of case 8 to become more inner diameter direction at the middle portion of the axial direction of case 8, namely, at a portion at which the axial length and axial directional position of each stator core 9 are made coincident with case 8. Thus, case 8 having a large thermal conductivity speedily discharges the heat generated by each stator core 9 and prevents an excessive heat of stator core 9.

Since each stator core tip (end) 9t is a magnetic pole of the armature, a magnetic flux density of a magnetic flux generated at each stator core 9 is largest at the proximity of each stator core tip 9t. In addition, a permanent magnet (not shown) is installed on each rotor 6 and a magnetic pole of the permanent magnet is opposed against each stator core tip 9t. Hence, gap portion 7 serves as an axial gap at a space (a space enclosed by a broken line in FIG. 1) interposed between stator core tip 9t and the permanent magnet (not shown).

A driving of the electric rotary machine is carried out by supplying appropriately an electric power to each coil winding 10. The magnetic flux in the direction of axle O is developed on each stator core 9 during the power supply of each of coil windings 10 and a magnetic path (a magnetic circuit) is formed between both rotors 6, 6 via (axial) gap portion 7. In this way, the magnetic path is directly formed between stator 5 and rotors 6 only via gap portions 7. Thus, the torque is efficiently given to rotors 6 and rotors 6 are accordingly rotated.

In this embodiment, each space sections 13 is provided at a position (or portion) of the case 8 near to each stator core tip 9t which is the magnetic pole of the stator side armature to interrupt the magnetic path between the stator and rotors. Hence, a large magnetic flux density developed at the proximity of each stator core tip 9t does not pass through case 8. Hence, the bypassing of the magnetic flux of each stator core 9 through (axial) gap portion 7 can be eliminated. Thus, the generation of the eddy current at case 8 and a thermal loss thereat can be prevented. It becomes possible for the magnetic flux of each stator core 9 to be magnetically connected to rotors 6 via (axial) gap portion 7 without leakage of the magnetic fluxes of respective stator cores 9. Consequently, the driving efficiency of the electric rotary machine can be improved.

Figure 2:
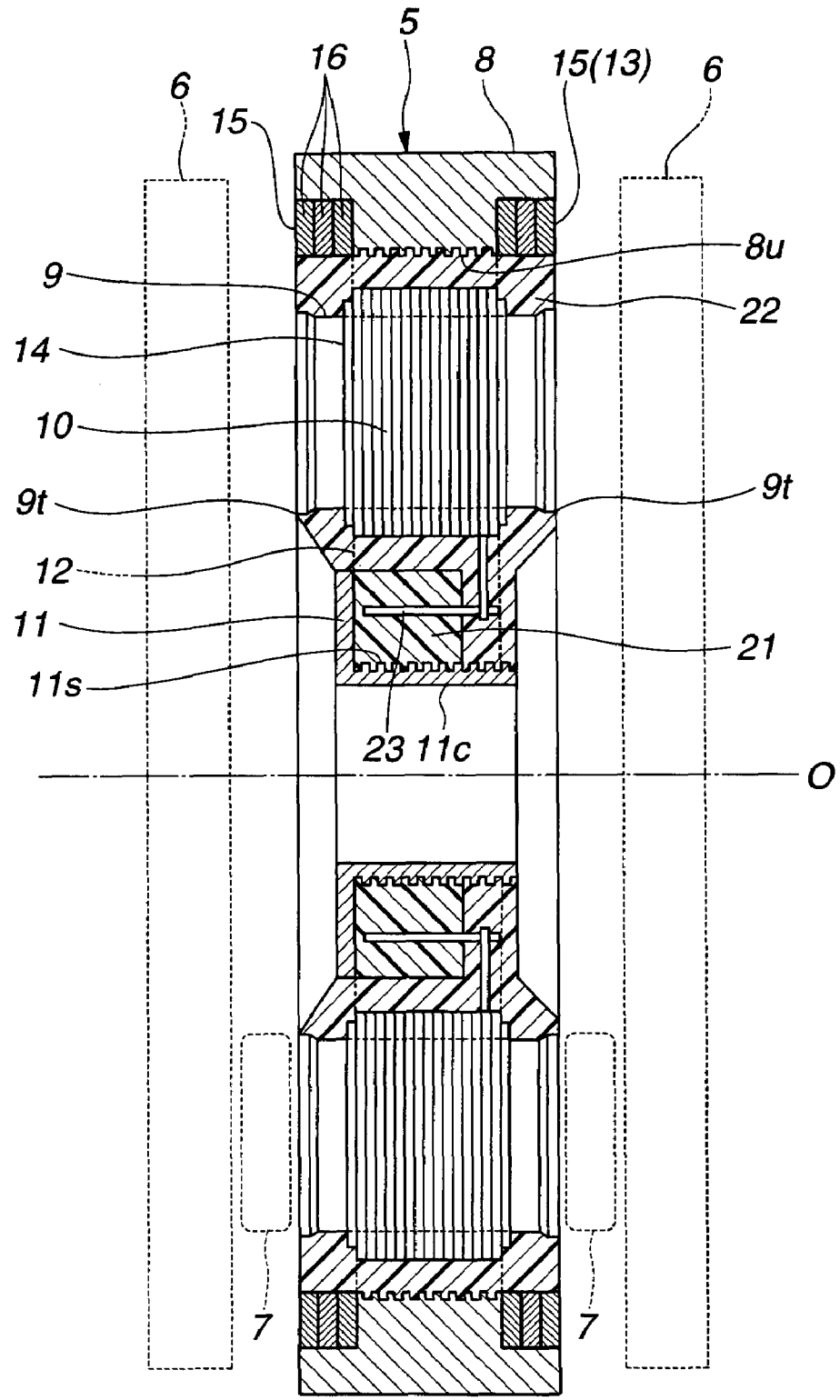
FIG. 2 is a longitudinal cross sectional view of another preferred embodiment of the electric rotary machine according to the present invention partially cut away with the plane including the axial line.

Next, the electric rotary machine in another preferred embodiment according to the present invention will be described below. FIG. 2 shows a longitudinally cross sectioned view of the stator in the other preferred embodiment of the electric rotary machine with the plane including the axial line in cross section. The structure of this embodiment is basically common to a basic structure of the above-described preferred embodiment shown in FIG. 1 but has a feature such that each space section is replaced with a bus-bar. That is to say, each space section in the embodiment is provided with bus-bar having the same size of each space section. Therefore, the same reference numerals as those shown in the above-described embodiment shown in FIG. 1 are the like elements and their explanations will be omitted herein. For the different elements from the above-described embodiment, new reference numerals are attached and their detailed explanations will be made below.

Bus-bar 15 is of an annular shape having approximately the same inner radius as case 8 and is equipped with a plurality of elements 16. Each element 16 has an inner part of an electrically conductive portion and has its outer periphery of the electrically conductive portion enclosed with an insulating material. Bus-bar 15 serves to electrically connect each of coil windings 10 to an inverter (not shown) installed externally to the electric rotary machine shown in FIG. 2 and serves to form a neutral point of three-phase alternating currents. In the embodiment shown in FIG. 2, bus-bar 15 in which three elements 16 through which three-phase alternating currents are individually caused to flow are aligned in the direction of axle O is attached onto each of both ends 9t, 9t in the direction of axle O of case 8. In details, bus-bar 15 is divided in the direction of axle O and is provided with elements 16. Then, bus-bar 15 is divided into small sizes in the direction of axle O and a size of each element 16 in the direction of axle O is made smaller than a size thereof in the radial direction which is a right angle to axle O.

In this embodiment, bus-bar 15 is installed at the position near each stator core tip 9t, 9t which is the magnetic pole of the stator side armature. Since each element 16 constituting bus-bar 15 is enclosed with the insulating material, bus-bar 15 is divided into small (or narrow) sized elements in the direction of axle O when bus-bar 15 is viewed from a representative one of stator core tips 9t, 9t. Hence, even if the magnetic flux enters each of small-sized (or narrow) elements 16, the eddy current and its loss can be reduced.

Figure 3:
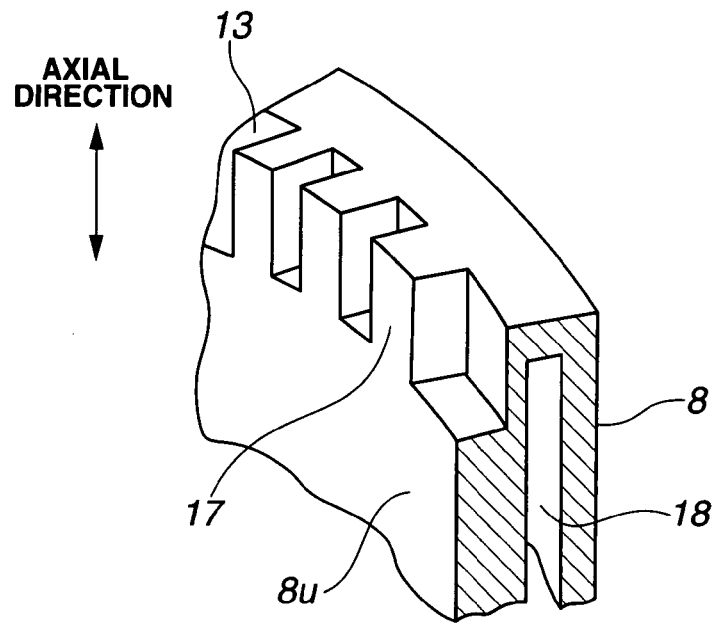
FIG. 3 is a perspective view of a case of the electric rotary machine in a still another preferred embodiment according to the present invention with the case partially broken.

Next, the electric rotary machine of a still another preferred embodiment according to the present invention will be described below. FIG. 3 shows a perspective view of the electric rotary machine with a part of case 8 cross sectioned. The basic structure of the still other preferred embodiment shown in FIG. 3 is common to the embodiment shown in FIG. 1 but a plurality of fins are installed in the axial direction within each space section 13. In the still other preferred embodiment which will be described hereinbelow, the same elements as those in the embodiment shown in FIG. 1 are not shown.

A plurality of block-shaped fins 17 are installed at each end (tip) in the axle direction of case 8 of the hollow cylindrical shape along the peripheral direction of case 8, as shown in FIG. 3. Therefore, a plurality of space sections 13 are formed between mutually abutting fins 17. In other words, rectangular cross sectioned recesses 13 are formed in the peripheral (circumferential) direction of case 8 at each axial end portion of case 8 of the hollow cylindrical shape.

Fins 17 and other space sections 13 are disposed on positions near stator core tips 9t, 9t which are the magnetic poles of the stator side armature. When these fins 17 located at an outer diameter side of inner wall 8u are viewed from stator core tips 9t, 9t located at the inner diameter side of inner wall 8u, fins 17 are divided into small divisions in the peripheral direction of case 8. Hence, even if the magnetic flux from each stator core tip 9t enters each small divided fin 17, the eddy current and its loss can be reduced. In addition, since each fin 17 is of the block shape, a rigidity of each end portion of case 8 can be secured.

In the embodiment shown in FIG. 3, another space section 18 is provided within an inner side of case 8 and a refrigerant is caused to flow through this space section 18. Thus, a temperature rise in the electric rotary machine can be prevented. Case 8 is formed of a metal such as aluminum having the high thermal conductivity. Hence, heat at each stator core 9 and each coil winding 10 of the electric rotary machine speedily passes inner wall 8u and is exhausted at this space section 18.

Figure 4:
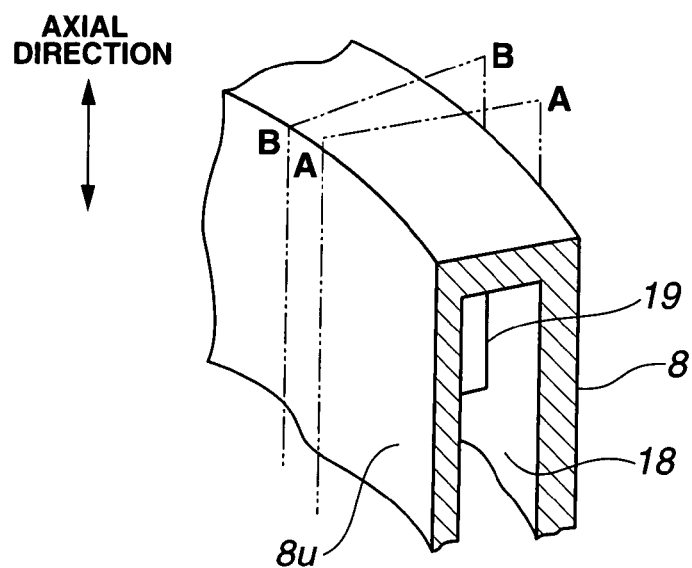
FIG. 4 is a perspective view of a part of the case of the electric rotary machine in a further another preferred embodiment according to the present invention with a part of the case broken.

Next, a further another preferred embodiment of the electric rotary machine will be described below. FIG. 4 shows a perspective view of the electric rotary machine whose part of case 8 is cross sectioned in the further other preferred embodiment of the electric rotary machine. A basic structure of the embodiment shown in FIG. 4 is common to the embodiment shown in FIG. 1 on all other members than the case and, therefore, the drawings thereof will be omitted herein. However, different components will be described with new reference numerals attached.

Figure 5:
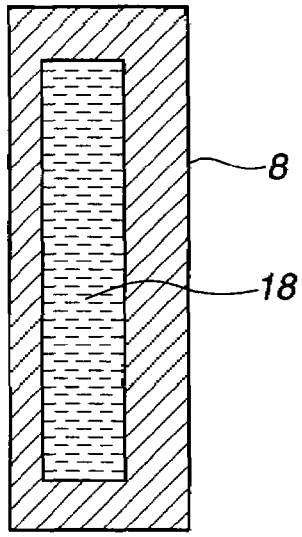
FIG. 5 is a cross sectional view of the part of the case shown in FIG. 4 cut away along a line of A-A in FIG. 4.
Figure 6:
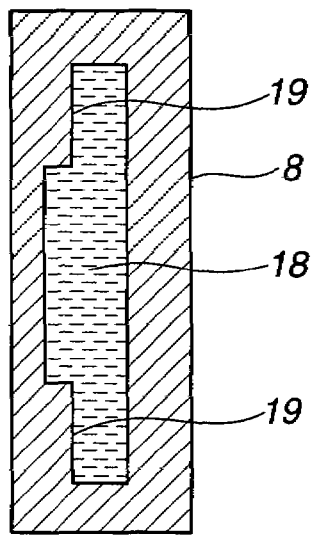
FIG. 6 is a cross sectional view of the part of the case shown in FIG. 4 cut away along a line of B-B in FIG. 4.

As shown in FIG. 4, space section 18 is installed in an inner part of case 8 of hollow cylindrical shape as in the same case of the still other embodiment shown in FIG. 3. Space section 18 is arranged with axial ends thereof extended as large as possible in the axial direction and extended toward the inner diameter side (as large as possible). A plurality of fins 19 of block shapes are extended at two of four corners of space section 18 located at the inner diameter side at the axial end portions of case 8. FIG. 5 shows a cross sectioned view cut away along a plane A-A denoted by a dot-dot-and-dash line with a part of case 8 in cross section and FIG. 6 shows a cross sectioned view cut away along a plane B-B denoted by a dot-dot-and-dash line with a part of case 8 thereof in cross section. As compared with FIGS. 5 and 6, it will be appreciated that the plurality of fins 19 are disposed in the peripheral direction of case 8 as space section 18 is present between these abutting fins 19. A refrigerant is filled within space section 18 and this refrigerant is circulated between space section 18 and a radiator to provide space section 18 with a passage of the refrigerant.

In this embodiment, space section 18 is formed within the inner part of case 8 supporting each stator core 9 and extended toward a position near to each stator core tip 9t. Space section 18 provides a passage through which the refrigerant is caused to flow in an inner part of case 8 supporting each stator core 9. Hence, even if the magnetic flux from each stator core tip 9t, 9t enters case 8, the eddy current and its loss can be reduced.

In this embodiment, when one of fins 19 shown in FIGS. 4 and 6 is viewed from stator core tip 9t, each of fins 19 is divided as a narrower unit in the peripheral direction of case 8. Hence, even if the magnetic flux from stator core tip 9t enters each small fin 19, the eddy current and its loss can be reduced. In addition, since each fin 19 is of the block shape, the rigidity of each end of case 8 can be secured.

In order to confirm the effect of the further other preferred embodiment shown in FIGS. 4 through 6, the applicants (inventors) of the present application uses a model of the same as the analytical model (FIG. 9) explained in the above-described SUMMARY OF THE INVENTION.

Figure 7:
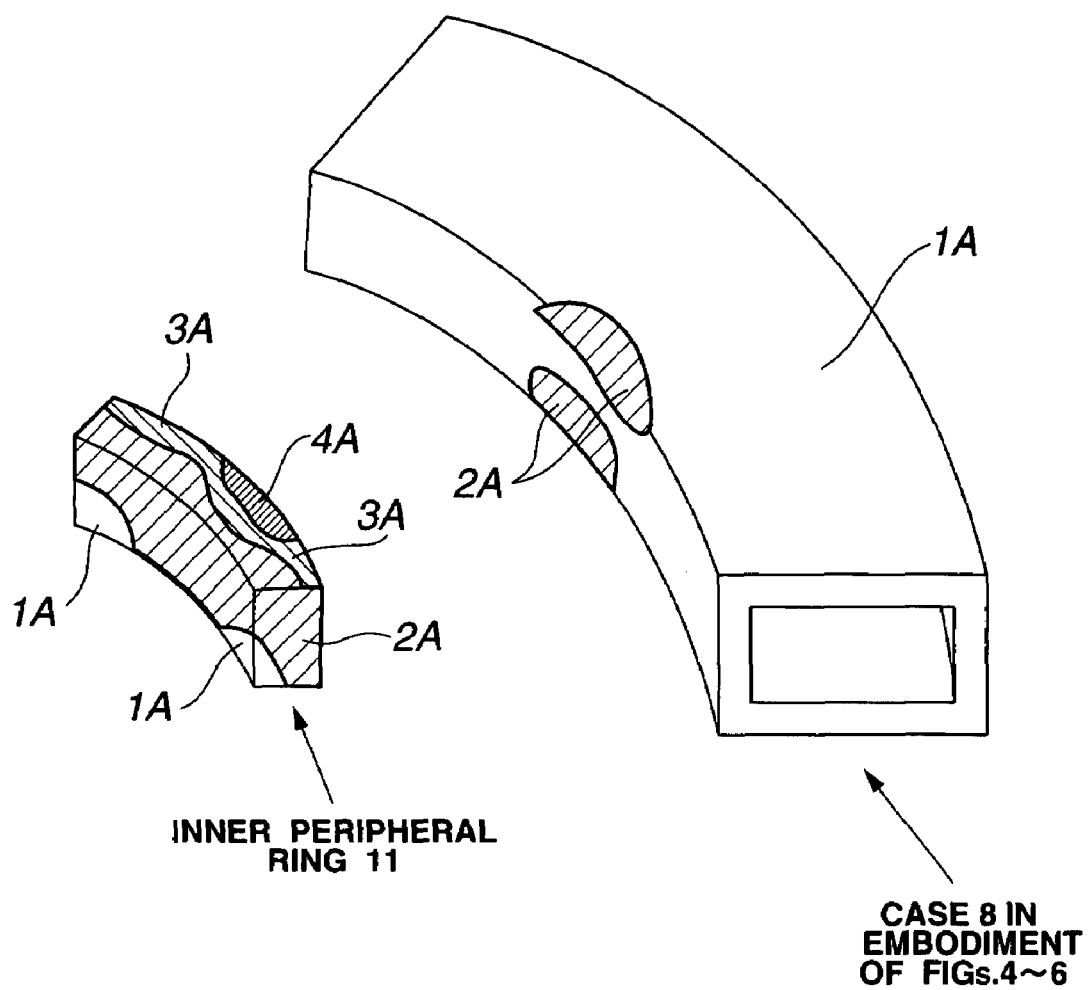
FIG. 7 is a perspective view of the case and an inner peripheral ring in the further other preferred embodiment of the electric rotary machine representing a result of analysis of a distribution of magnetic fluxes of the inner peripheral ring and the case in the further another preferred embodiment under the same condition as a model shown in FIG. 9.
Figure 8:
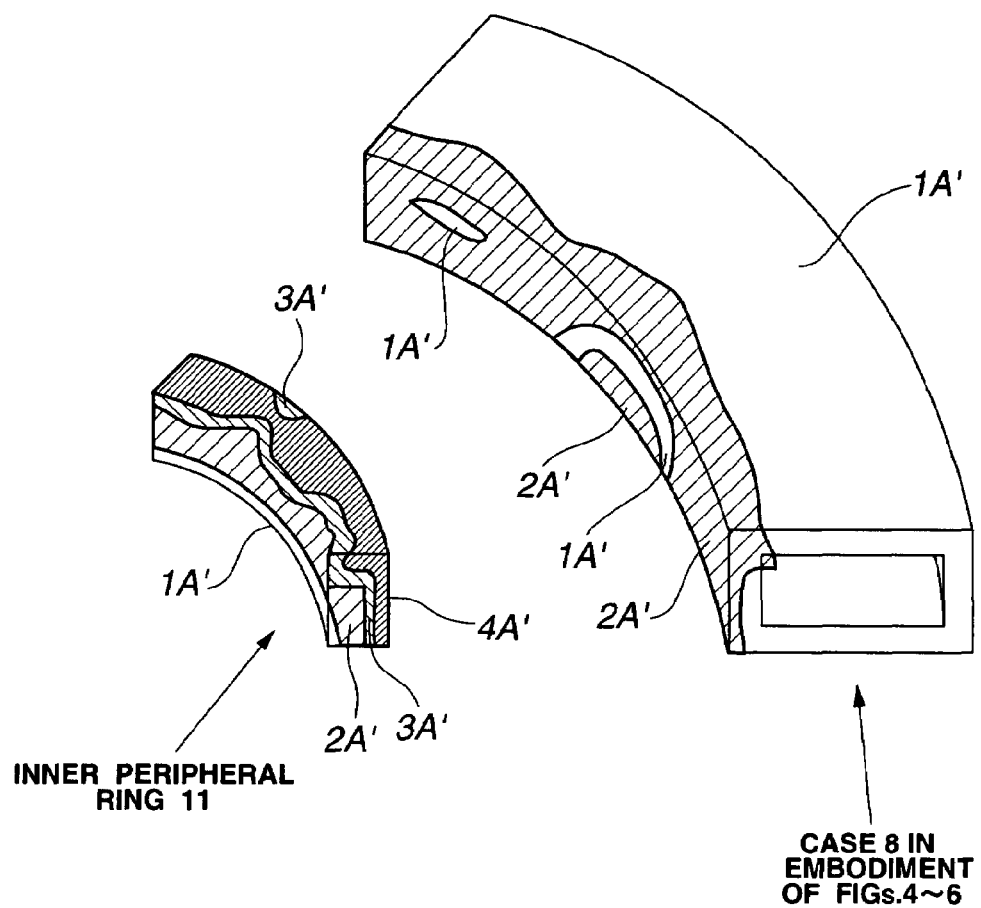
FIG. 8 is a perspective view of the case and the inner peripheral ring in the further other preferred embodiment of the electric rotary machine representing a result of analysis of a distribution of eddy current densities of the inner peripheral ring and the case in the further other preferred embodiment under the same condition as a model shown in FIG. 9.
Figure 9:
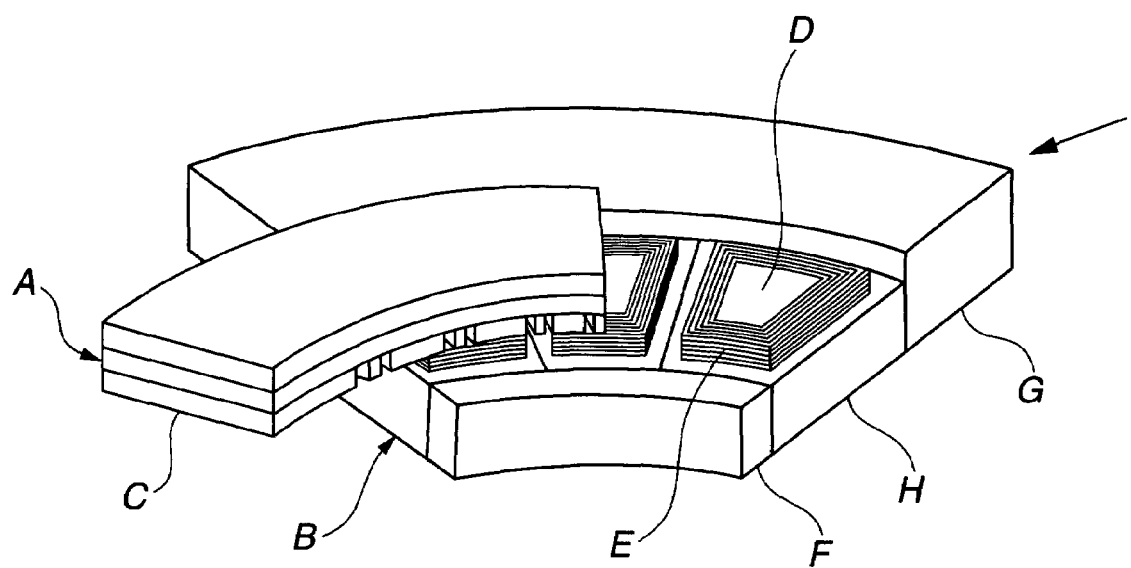
FIG. 9 is a partially cross sectioned perspective view of an analytical model which is a comparative example of an axial gap electric rotary machine in which a rotor and a stator are arranged in an axial direction to the present invention.

FIG. 7 shows a perspective view of case 8 equivalent to outer peripheral ring G as inner peripheral ring 11 equivalent to inner peripheral ring F shown in FIG. 9 as viewed from an arrow-marked direction in FIG. 9. When the electric rotary machine in the further other preferred embodiment shown in FIGS. 4 through 6 is in the acceleration driving as the electric rotary machine of the axial gap type in the comparative example with the same predetermined electric power, magnetic flux density distribution of the leakage magnetic flux passing through inner peripheral ring F and outer peripheral ring G not the rotor nor the stator is divided into a plurality of zones. In the inner part of case 8 shown in FIGS. 7 and 8, space section 18 is disposed in the inner part of case 8 as shown in FIGS. 4 through 6.

Figure 10:
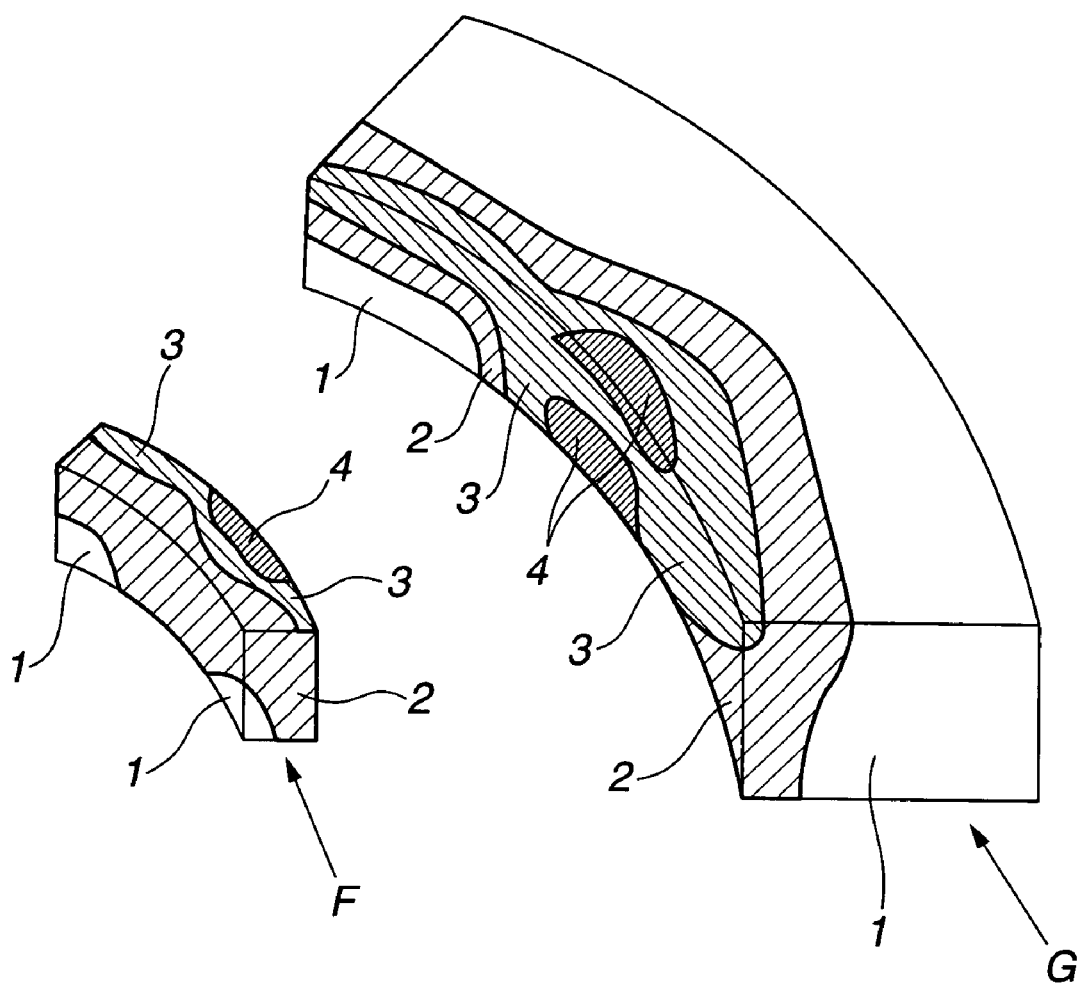
FIG. 10 is a perspective view representing a magnetic flux density distribution of the inner peripheral ring and an outer peripheral ring in the analytical model shown in FIG. 9.

In FIG. 7, zone 4A indicates a large magnetic flux density, and the magnetic flux densities become smaller in the order of zone 3A, zone 2A, and zone 1A. While comparing with outer peripheral ring G of the comparative example of the electric rotary machine shown in FIG. 10 having no space section 18, case 8 shown in FIG. 7 indicating the effect of the embodiment shown in FIGS. 4 through 6 is analyzed. In this case, the density distribution of the leakage magnetic flux can remarkably be reduced according to the case in the embodiment shown in FIGS. 4 through 6 according to the present invention.

FIG. 8 shows the eddy current density distribution caused by the leakage magnetic flux described above in the zone division form. In FIG. 8, zone 4A' is the large eddy current density and the eddy current densities become smaller in the order of zone 3A', zone 2A', and zone 1A'.

Figure 11:
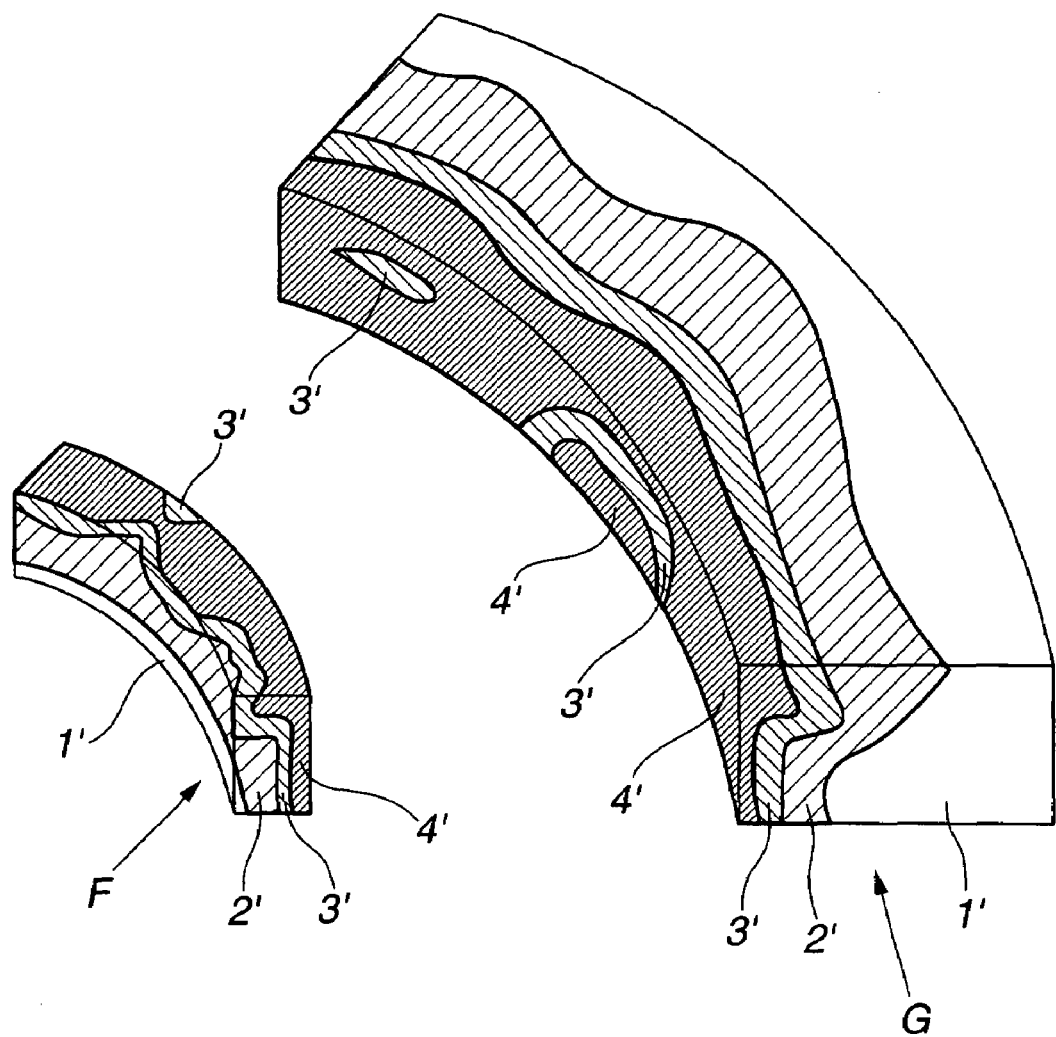
FIG. 11 is a perspective view representing an eddy current density distribution of the inner peripheral ring and an outer peripheral ring in the analytical model shown in FIG. 9.

When case 8 shown in FIG. 8 is viewed indicating the effect of the embodiment shown in FIGS. 4 through 6, while comparing with outer peripheral ring G of the comparative example shown in FIG. 11 having no space section 18, the density distribution of the eddy current can remarkably be reduced according to case 8 in the embodiment according to the present invention.

According to each embodiment described above, the position of case 8 made of a metal and supporting stator cores 9 of the stator which faces against gap portion 7 near magnetic pole 9t of stator side armature is provided with space section 13 which interrupts the magnetic path. Hence, the problem such that the large magnetic flux passes the case can be eliminated, a thermal loss due to the eddy current is largely suppressed, and an undesired temperature rise of the electric rotary machine can be suppressed. In addition, the leakage of the magnetic flux from the magnetic path formed via gap portion 7 between stator core tip 9t and rotor 6 can be eliminated. The magnetic path is formed so as to connect magnetic pole 9t of the stator side armature installed on stator 5 and the magnetic pole or a salient pole of the permanent magnet installed on rotor 6 at a shortest distance. The improvement in the driving efficiency and an augment effect of the torque can be expected. When the large torque driving at which the magnetic flux density of the magnetic path becomes large is carried out, the effect of the heat generation suppression and that of the improvement in the driving efficiency can be enjoyed.

In addition to space sections 13 in the embodiment shown in FIG. 1, specifically, if space sections 13 are replaced with (or provided with) bus-bar 15 enclosed with the insulating material for connecting each coil winding 10 to the inverter (not shown) of the electric rotary machine, the same effect as the embodiment shown in FIG. 1 can be achieved.

In the embodiment shown in FIG. 2, bus-bar 15 as viewed from magnetic pole 9t of stator 5 is divided narrowly into the plurality of elements 16, each enclosed with the insulating material. Thus, even if the magnetic flux from each stator core tip 9t enters each element 16 whose magnetic flux is narrowly small, the eddy current and its loss can be reduced.

In addition, in the embodiment shown in FIG. 3, a plurality of fins 17 are installed within space sections 13. Hence, the rigidity (or strength) of each end portion of case 8 can be secured.

In the embodiment shown in FIG. 3, as viewed from magnetic pole 9t of stator 5, fins 17 and space sections 13 positioned between mutually abutting fins 17 are alternately aligned. Hence, fins 17 are divided narrowly into small ones. Even if the magnetic flux from each magnetic pole tip 9t of stator 5 enters each small fin 17, the eddy current and its loss can be reduced. Furthermore, the provision of fins 17 can secure the rigidity of each end portion of case 8. It should be noted that, in each of the embodiments shown in FIGS. 1 through 3, space section 18 may be provided at the inner part of case 8 and the refrigerant may be caused to flow through space section 18.

In addition, space section 18 is formed as a passage through which the refrigerant is caused to flow in the inside (inner part) of case 8 in the embodiment shown in FIG. 4. This passage is utilized as space section 18 interrupting the magnetic path. Hence, the same effects as those in each of the embodiments shown in FIGS. 1 through 3 can be exhibited.

In addition, in each embodiment shown in FIGS. 1 through 4, metallic member supporting stator 5 is a case 8 forming a crust of the electric rotary machine. Thus, the heat can be exhausted to an external portion of the outside of case 8 speedily from case 8 from each stator core 9 and each of coil windings 10 which are heat sources of stator 5, the strength (rigidity) of stator 5 can be secured, the rise in temperature exceeding an appropriate temperature range can effectively be prevented.

In addition, in each embodiment shown in FIGS. 1 through 4, stator 5 and rotors 6 are opposed in the direction of axle O to form the axial gap electric rotary machine. Case 8 is formed of the hollow cylindrical shape and supports stator 5 with inner wall 8u. Hence, the effect of the present invention can enjoy the axial gap electric rotary machine.

Specifically, in the embodiment of the axial gap electric rotary machine shown in FIG. 2, bus-bar 15 is arranged at substantially the same position as the position of axle O of each magnetic pole 9t of stator 5 and this bus-bar 15 is divided into the direction of axle O so that three elements 16 are formed, the size of the direction of axle O of these elements 16 being made smaller than the size of the radial direction thereof. Hence, even if the magnetic flux from each stator core tip 9t enters each small element 16, the eddy current and its loss can be reduced.

This application is based on a prior Japanese Patent Application No. 2006-131400. The entire contents of a Japanese Patent Application No. 2006-131400 with a filing date of May 10, 2006 are hereby incorporated by reference. Although the invention has been described above by reference to certain embodiments of the invention, the invention is not limited to the embodiments described above. Modifications and variations of the embodiments described above will occur to those skilled in the art in light of the above teachings. For example, the present invention is not only applicable to the axial gap electric rotary machine but also applicable to a radial gap electric rotary machine. The scope of the invention is defined with reference to the following claims.

What is claimed is:

1. An axial gap electric rotary machine comprising:
   a stator;
   a metallic supporting member configured to support the stator; and
   a rotor, the rotor being relatively rotatably supported to the stator, the stator and the rotor being opposed in an axial direction of the stator to form an axial gap, a magnetic path being formed via a gap portion between the stator and the rotor to give a torque to the rotor, and a space section being provided on a portion of the metallic supporting member near a magnetic pole of the stator facing the gap portion to interrupt the magnetic path.

2. The axial gap electric rotary machine as claimed in claim 1, wherein a plurality of fins are installed in the space section.

3. The axial gap electric rotary machine as claimed in claim 2, wherein the fins are installed in a plurality of the space sections, each of the fins and the space sections being alternately aligned, as viewed from the magnetic pole of the stator.

4. The axial gap electric rotary machine as claimed in claim 3, wherein a passage through which a refrigerant is caused to flow is formed in an inner part of the metallic supporting member, the passage being utilized as the space sections.

5. The axial gap electric rotary machine as claimed in claim 1, wherein a passage through which a refrigerant is caused to flow is formed in an inner part of the metallic supporting member, the passage being utilized as the space section.

6. The axial gap electric rotary machine as claimed in claim 1, wherein the metallic supporting member is a case forming an outer shell of the electric rotary machine.

7. An axial gap electric rotary machine comprising:
   a stator;
   a metallic supporting member configured to support the stator; and
   a rotor, the rotor being relatively rotatably supported to the stator, a magnetic path being formed via a gap portion between the stator and the rotor to give a torque to the rotor, and a space section being provided on a portion of the metallic supporting member near a magnetic pole of the stator facing the gap portion to interrupt the magnetic path, wherein the metallic supporting member is a case forming an outer shell of the electric rotary machine, and wherein the rotor comprises two rotors, the stator and each of the rotors are opposed in an axial direction of the stator to form an axial gap, and the case is formed of a hollow cylindrical shape and is configured to support the stator on an inner peripheral surface of the case of the hollow cylindrical shape.

8. The axial gap electric rotary machine as claimed in claim 7, wherein a bus-bar is arranged at approximately the same position as the position of the magnetic pole of the stator in an axial direction of the stator and the bus-bar is divided into a plurality of elements in the axial direction of the stator and a size of each of the elements in the axial direction of the stator is made smaller than the size of each of the elements in a radial direction of the stator.

9. The axial gap electric rotary machine as claimed in claim 8, wherein the plurality of elements of the bus-bar are three.

10. An axial gap electric rotary machine comprising:
    a stator;
    a metallic supporting member configured to support the stator; and a rotor, the rotor being relatively rotatably supported to the stator, a magnetic path being formed via a gap portion between the stator and the rotor to give a torque to the rotor, and a space section being provided on a portion of the metallic supporting member near a magnetic pole of the stator facing the gap portion to interrupt the magnetic path, wherein the metallic supporting member is a case forming an outer shell of the electric rotary machine, wherein the rotor comprises two rotors, the stator and each of the rotors are opposed in an axial direction of the stator to form an axial gap, and the case is formed of a hollow cylindrical shape and is configured to support the stator on an inner peripheral surface of the case of the hollow cylindrical shape and wherein a plurality of stator cores are aligned along the inner peripheral surface of the case in a peripheral direction of the stator and are extended in an axial direction of the stator, a coil winding is wound on each of the stator cores, and each of recesses is formed at an axial end of the case and is formed toward an end of each of the stator cores to form the space section.

11. The axial gap electric rotary machine as claimed in claim 10, wherein each of the recesses is a rectangular cross sectioned recess.

12. The axial gap electric rotary machine as claimed in claim 10, wherein each of the recesses is a plurality of rectangular cross sectioned recesses.

13. An axial gap electric rotary machine comprising:
stator means;
metallic supporting means for supporting the stator means; and
rotor means, the rotor means being relatively rotatably supported to the stator means, the stator means and the rotor means being opposed in an axial direction of the stator means to form an axial gap, a magnetic path being formed via a gap portion between the stator means and the rotor means to give a torque to the rotor means, and space means for interrupting the magnetic path being provided on a portion of the metallic supporting means near a magnetic pole of the stator means facing the gap portion.

14. An axial gap electric rotary machine comprising:
a stator;
a metallic supporting member configured to support the stator; and
a rotor, the rotor being relatively rotatably supported to the stator, the stator and the rotor being opposed in an axial direction of the stator to form an axial gap, a magnetic path being formed via a gap portion between the stator and the rotor to give a torque to the rotor, and a bus-bar being provided on a portion of the metallic supporting member near a magnetic pole of the stator facing the gap portion to interrupt the magnetic path.

15. The axial gap electric rotary machine as claimed in claim 14, wherein the bus-bar is enclosed with an insulating material, the bus-bar connecting a coil winding of the stator and an external power supply of the electric rotary machine.

16. The axial gap electric rotary machine as claimed in claim 15, wherein the bus-bar as viewed from the magnetic pole of the stator is divided into a plurality of elements, each of the elements being enclosed with the insulating material.

* * * * *